C. KINDSCHERF.
DETACHABLE WHEEL RIM.
APPLICATION FILED JUNE 30, 1908.
934,187.
Patented Sept. 14, 1909.
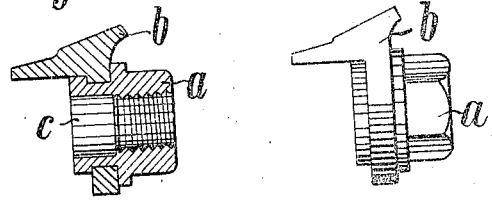
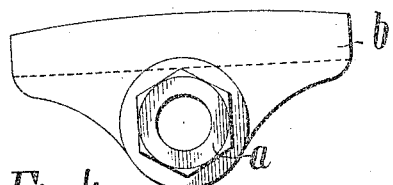
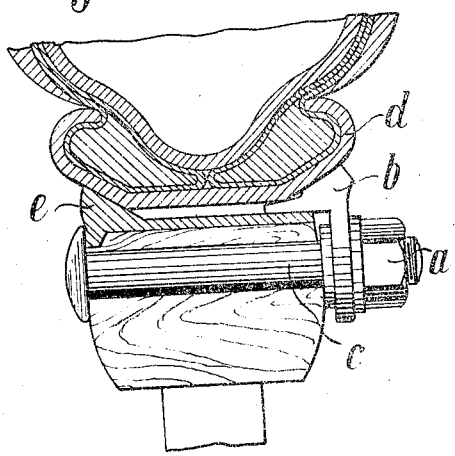
INVENTOR
Carl Kindscherf
WITNESSES
ATTORNEYS

UNITED STATES PATENT OFFICE.

CARL KINDSCHERF, OF HANOVER, GERMANY, ASSIGNOR TO THE FIRM OF CONTINENTAL-CAOUTCHOUC & GUTTA-PERCHA COMPAGNIE, OF HANOVER, GERMANY.

DETACHABLE WHEEL-RIM.

934,187.  Specification of Letters Patent. Patented Sept. 14, 1909.

Application filed June 30, 1908. Serial No. 441,251.

*To all whom it may concern:*

Be it known that I, CARL KINDSCHERF, a subject of the Grand Duke of Baden, residing at 1 Göbenstrasse, Hanover, Germany, have invented certain new and useful Improvements in Detachable Wheel-Rims, of which the following is a specification.

In the devices hitherto used for automobile wheels and the like in which detachable rims carrying the rubber tire are fastened onto the felly of the wheel by means of screws, nuts and wedge-pieces secured by the latter, the nut must be turned completely off the bolt in order that the wedge-piece may be taken off for the purpose of removing the rim. A considerable amount of time is necessary for taking off the tire and it frequently happens that the nut and the wedge-piece are misplaced or lost. These dangers are avoided by the present device. In this, the nut is permanently connected with the wedge-piece. By turning the nut the wedge-piece is drawn out so far that the tire rim can be conveniently taken off the felly, or changed as desired.

In the accompanying drawing, Figure 1 is a section of the nut mounted on the wedge-piece; and Figs. 2 and 3 are elevations of the same at right angles to each other. Fig. 4 shows the arrangement of the nut, the wedge-piece with the felly and the tire-rim.

The nut $a$ can be turned in the wedge-piece $b$, but is secured by the flanges so that as the nut is turned on the bolt shaft $c$ the wedge-piece must follow the movement of the nut. In this arrangement, the nut need only be turned back a suitable distance on the bolt $c$, for the rim $d$ to be removed. A complete unscrewing of the nut from the bolt is not necessary. The wedge-piece is arranged in a known manner between the felly $e$ of the wheel and the tire rim $d$. The wedge and bolt may be assembled in any desired manner. Thus the flange by which the wedge piece $b$ is secured to the nut $a$ may comprise opposed lugs which enter opposite sides of the channel formed in the nut, the ends of the lugs being then bent toward each other to form a bearing in which the nut rotates. The wedge-piece can be turned on the nut in order to move it out of the way of the rim when the latter is taken off. The wedge-piece may be given any desired form. Similarly, the connection with the nut can be effected in various manners without departing from my invention.

I claim as my invention:

A device for securing removable tire rims of the character described, comprising a bolt and a nut working thereon together with a wedge piece pivoted on said nut and adapted to engage a rim, said wedge piece being moved into and out of engagement with said rim by the rotation of said nut and swiveling on said nut when cleared of said rim, so as to permit the removal of the latter, as described.

In testimony whereof I have signed my name to this specification, in the presence of two subscribing witnesses.

CARL KINDSCHERF.

Witnesses:
  OTTO FHLAU,
  FRANZ SUTORIUS.